(12) United States Patent
Whinnett et al.

(10) Patent No.: US 8,205,129 B2
(45) Date of Patent: Jun. 19, 2012

(54) RETRANSMISSION IN A CELLULAR COMMUNICATION SYSTEM

(75) Inventors: Nick W. Whinnett, Marlborough (GB); David C. Padfield, Marlborough (GB)

(73) Assignee: Motorola Mobility, Inc., Libertyville, IL (US)

(*) Notice: Subject to any disclaimer, the term of this patent is extended or adjusted under 35 U.S.C. 154(b) by 1057 days.

(21) Appl. No.: 12/067,961

(22) PCT Filed: Nov. 15, 2006

(86) PCT No.: PCT/US2006/044430
§ 371 (c)(1),
(2), (4) Date: Mar. 25, 2008

(87) PCT Pub. No.: WO2007/064483
PCT Pub. Date: Jun. 7, 2007

(65) Prior Publication Data
US 2008/0256411 A1    Oct. 16, 2008

(30) Foreign Application Priority Data
Nov. 28, 2005  (GB) .................................. 0524240.9

(51) Int. Cl.
*H03M 13/00* (2006.01)
(52) U.S. Cl. ....................................................... 714/750
(58) Field of Classification Search .................. 714/704, 714/705, 712, 713, 745–751, 758, 780, 781
See application file for complete search history.

(56) References Cited

U.S. PATENT DOCUMENTS

| | | | |
|---|---|---|---|
| 5,475,868 A | | 12/1995 | Duque-Anton et al. |
| 6,154,489 A | * | 11/2000 | Kleider et al. ................. 375/221 |
| 6,445,916 B1 | * | 9/2002 | Rahman ........................ 455/423 |
| 6,519,223 B1 | | 2/2003 | Wager et al. |
| 7,120,448 B2 | * | 10/2006 | Brouwer ........................ 455/453 |
| 7,203,461 B2 | * | 4/2007 | Chang et al. ................ 455/67.13 |
| 7,236,474 B2 | * | 6/2007 | Seo et al. ...................... 370/329 |

(Continued)

FOREIGN PATENT DOCUMENTS
EP    1422898 A1    5/2004
(Continued)

OTHER PUBLICATIONS

Richard Howe, "Parent Application GB 0524240.9—Combined Search and Examination Report Under Sections 17 and 18(3)," The Patent Office, Patents Directorate, Newport, South Wales, Mar. 16, 2006, 5 pages.

(Continued)

*Primary Examiner* — Nadeem Iqbal

(57) ABSTRACT

A base station (103) operates a hybrid retransmission scheme for a communication to a first subscriber unit (101) over a communication channel of an air interface of a cellular communication system. The base station (103) comprises a retransmission parameter controller (209) which sets a transmission parameter, such as a transmit power or an error correcting scheme, for a transmission of the communication in response to an operating point for the retransmission scheme. A CQI processor (203) determines a channel quality indication for the communication channel and a variation processor (205) determines a variation measure of a variation of the channel quality indication. The variation measure can for example be a rate of change. An operating point controller (207) sets the operating point in response to the variation measure. The invention may allow improved setting of transmission parameters for initial transmissions thereby providing higher throughput, reduced resource consumption and reduced delay.

9 Claims, 3 Drawing Sheets

U.S. PATENT DOCUMENTS

| | | | |
|---|---|---|---|
| 2003/0198312 | A1 | 10/2003 | Budka et al. |
| 2004/0253968 | A1* | 12/2004 | Chang et al. ............ 455/513 |
| 2005/0181832 | A1 | 8/2005 | Shii et al. |
| 2009/0150738 | A1* | 6/2009 | Nishio et al. ............ 714/749 |

FOREIGN PATENT DOCUMENTS

| | | |
|---|---|---|
| EP | 1592139 B1 | 5/2011 |
| EP | 1513282 B1 | 7/2011 |
| GB | 2380374 A | 4/2003 |
| GB | 2 432 751 B | 11/2007 |

OTHER PUBLICATIONS

Lee W. Young, "Corresponding Application PCT/US2006/044430—PCT International Search Report and Written Opinion," WIPO, ISA/US, Commissioner for Patents, Alexandria, VA, USA, Oct. 5, 2007, 7 pages, most relevant pp. 3 and 6.

Athina Nickitas-Etienne, "Corresponding Application PCT/US2006/044430—PCT International Preliminary Report on Patentability," The International Bureau of WIPO, Geneva, Switzerland, Jun. 12, 2008, 5 pages, most relevant pp. 2 and 5.

Korean Examiner, Corresponding Application KR 10-2008-7012653—"KIPO's Notice of Preliminary Rejection," Korean Intellectual Property Office, Daejeon, Republic of Korea, Nov. 30, 2009, 7 pages, most relevant pp. 1-3.

Supplementary European Search Report, The Hague, Jan. 27, 2012, all pages.

* cited by examiner

RETRANSMISSION IN A CELLULAR COMMUNICATION SYSTEM

FIELD OF THE INVENTION

The invention relates to retransmission in a cellular communication system and in particular, but not exclusively to retransmission in a $3^{rd}$ Generation Cellular communication system.

BACKGROUND OF THE INVENTION

In a cellular communication system, a geographical region is divided into a number of cells served by base stations. The base stations are interconnected by a fixed network which can communicate data between the base stations. A mobile station is served via a radio communication link from the base station of the cell within which the mobile station is situated.

A typical cellular communication system extends coverage over an entire country and comprises hundreds or even thousands of cells supporting thousands or even millions of mobile stations. Communication from a mobile station to a base station is known as the uplink, and communication from a base station to a mobile station is known as the downlink.

The fixed network interconnecting the base stations is operable to route data between any two base stations, thereby enabling a mobile station in a cell to communicate with a mobile station in any other cell. In addition, the fixed network comprises gateway functions for interconnecting to external networks such as the Internet or the Public Switched Telephone Network (PSTN), thereby allowing mobile stations to communicate with landline telephones and other communication terminals connected by a landline. Furthermore, the fixed network comprises much of the functionality required for managing a conventional cellular communication network including functionality for routing data, admission control, resource allocation, subscriber billing, mobile station authentication etc.

The most ubiquitous cellular communication system is the 2nd generation communication system known as the Global System for Mobile communication (GSM). GSM uses a technology known as Time Division Multiple Access (TDMA) wherein user separation is achieved by dividing frequency carriers into eight discrete time slots, which individually can be allocated to a user. Further description of the GSM TDMA communication system can be found in 'The GSM System for Mobile Communications' by Michel Mouly and Marie Bernadette Pautet, Bay Foreign Language Books, 1992, ISBN 2950719007.

Currently, 3rd generation systems are being rolled out to further enhance the communication services provided to mobile users. The most widely adopted 3rd generation communication systems are based on Code Division Multiple Access (CDMA) technology. Both Frequency Division Duplex (FDD) and Time Division Duplex (TDD) techniques employ this CDMA technology. In CDMA systems, user separation is obtained by allocating different spreading and scrambling codes to different users on the same carrier frequency and in the same time intervals. In TDD, additional user separation is achieved by assigning different time slots to different users in a similar way to TDMA. However, in contrast to TDMA, TDD provides for the same carrier frequency to be used for both uplink and downlink transmissions. An example of a communication system using this principle is the Universal Mobile Telecommunication System (UMTS). Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876.

In a 3rd generation cellular communication system, the communication network comprises a core network and a Radio Access Network (RAN). The core network is operable to route data from one part of the RAN to another, as well as interfacing with other communication systems. In addition, it performs many of the operation and management functions of a cellular communication system. The RAN is operable to support wireless user equipment over a radio link of the air interface. The RAN comprises the base stations, which in UMTS are known as Node Bs, as well as Radio Network Controllers (RNCs) which control the base stations and the communication over the air interface.

The RNC performs many of the control functions related to the air interface including radio resource management and routing of data to and from appropriate base stations. It further provides the interface between the RAN and the core network. An RNC and associated base stations are collectively known as a Radio Network Subsystem (RNS).

3rd generation cellular communication systems have been specified to provide a large number of different services including efficient packet data services. For example, downlink packet data services are supported within the $3^{rd}$ Generation Partnership Project (3GPP) release 5 Technical Specifications in the form of the High Speed Downlink Packet Access (HSDPA) service.

In accordance with the 3GPP specifications, the HSDPA service may be used in both Frequency Division Duplex (FDD) mode and Time Division Duplex (TDD) mode.

In HSDPA, transmission code resources are shared amongst users according to their traffic needs. The base station (also known as the Node-B for UMTS) is responsible for allocating and distributing the HSDPA resources amongst the individual calls. In a UMTS system that supports HSDPA, some of the code allocation is performed by the RNC whereas other code allocation, or more specifically, scheduling is performed by the base station. Specifically, the RNC allocates a set of resources to each base station, which the base station can use exclusively for high speed packet services. The RNC furthermore controls the flow of data to and from the base stations. However, the base station is responsible for scheduling HS-DSCH transmissions to the mobile stations that are attached to it, for operating a retransmission scheme on the HS-DSCH channels, for controlling the coding and modulation for HS-DSCH transmissions to the mobile stations and for transmitting data packets to the mobile stations.

HSDPA seeks to provide packet access techniques with a relatively low resource usage and with low latency.

Specifically, HSDPA uses a number of techniques in order to reduce the resource required to communicate data and to increase the capacity of the communication system. These techniques include Adaptive Coding and Modulation (AMC), retransmission with soft combining and fast scheduling performed at the base station.

HSDPA specifically employs a retransmission scheme known as Hybrid Automatic Repeat reQuest (H-ARQ). In the H-ARQ scheme incremental redundancy is provided by a use of soft combining of data from the original transmission and any retransmissions of a data packet. Thus, when a receiver receives a retransmission, it combines the received information with information from any previous transmission of the data packet. The retransmissions may comprise retransmissions of the same channel data or different channel data may be transmitted. For example, retransmissions may comprise additional redundant data of a Forward Error Correcting (FEC) scheme. The additional encoding data may be combined with encoded data of previous transmissions and a decoding operation may be applied to the combined data. Hence, the retransmission may effectively result in a lower rate (higher redundancy) encoding of the same information data.

In order to achieve a high efficiency of a retransmission scheme such as HARQ, it is essential that the transmissions parameters of the individual transmissions are set as optimally as possible. For example, setting the parameters such that the resulting reliability of the individual transmission is too low (e.g. by setting the transmit power too low) will result in a requirement for too many retransmissions causing a high combined resource usage and high latency. Setting the parameters such that the resulting reliability of the individual transmission is too high (e.g. by setting the transmit power too high) will result in virtually no retransmissions but an excessive resource usage for the first transmission and thus a high total resource usage. Thus, it can be shown that for a given set of conditions an optimum set of transmission parameters (e.g. in terms of resource utilisation) exist.

In cellular communication systems, the transmission parameters for the initial transmission of a data packet are typically predetermined parameters that on average have been found to provide a suitable performance. However, such an approach does not take into account the current propagation conditions or the variations in the transmission and propagation characteristics and therefore results in a suboptimal setting of the transmission parameters leading to increased error rates, reduced throughout, increased resource utilisation and increased delays.

Hence, an improved system for operating a hybrid retransmission scheme in a cellular communication system would be advantageous and in particular a system allowing improved transmission parameter setting, increased flexibility, reduced error rates, increased throughout, reduced resource utilisation, reduced delays and/or improved performance of the cellular communication system would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided an apparatus for operating a hybrid retransmission scheme for a communication to a first subscriber unit over a communication channel of an air interface of a cellular communication system, the apparatus comprising: setting means for setting a transmission parameter for a transmission of the communication in response to an operating point for the retransmission scheme; means for determining channel quality indications for the communication channel; means for determining a variation measure of a variation of the channel quality indications; and means for setting the operating point in response to the variation measure.

The invention may provide improved retransmission performance in a cellular communication system. In particular, an improved setting of an operating point for the retransmission scheme leading to a more optimal setting of transmission parameters may be achieved leading to reduced error rates, increased throughout, reduced resource utilisation, reduced delays and/or improved performance of the cellular communication system as a whole.

Specifically, the inventors have realised that an operating point can advantageously be controlled in response to variations in a channel quality indication thereby improving the performance and operating characteristics of the hybrid retransmission scheme and the performance of the cellular communication system.

According to an optional feature of the invention, the variation measure is a measure of a rate of change of the channel quality indication.

This may provide particularly advantageous performance and/or may facilitate implementation.

According to an optional feature of the invention, the operating point comprises an error rate target.

This may provide particularly advantageous performance and/or may facilitate implementation. In particular, an error rate target may provide a simple yet efficient control of the retransmission scheme and may provide improved backwards compatibility.

According to an optional feature of the invention, the transmission parameter is a parameter of an initial transmission of a data packet.

The invention may allow improved setting of a transmission parameter for the initial transmission of data packet for which no information has previously been transmitted. This may result in improved communication and reduced resource consumption.

According to an optional feature of the invention, the apparatus comprises means for determining a measured error rate indication of transmissions to the first subscriber unit and wherein the setting means is arranged to determine the transmission parameter in response to the measured error rate indication.

This may provide particularly advantageous performance and/or may facilitate implementation. In particular, it may allow an improved setting of transmission parameters taking into account different characteristics which have significant effect on the performance of the retransmission scheme.

According to an optional feature of the invention, the measured error rate is compared to the operating point to determine the transmit parameter This may provide particularly advantageous performance and/or may facilitate implementation. In particular, it may allow an easy to implement retransmission scheme that takes into account different characteristics which have significant effect on the performance of the retransmission scheme.

According to an optional feature of the invention, the setting means is arranged to set the transmission parameter in response to the channel quality indication and to modify the channel quality indication in response to the measure error rate indication.

This may provide particularly advantageous performance and/or may facilitate implementation.

According to an optional feature of the invention, the transmission parameter is an information data size for a data packet of the hybrid retransmission scheme.

This may provide particularly advantageous performance and/or may facilitate implementation. The information data size constitutes a parameter which allows a particularly effective control of the probability of the receiver being able to successfully receive the data packet. Information data refers to the underlying data which is to be retrieved by the receiver i.e. to the transmitted data prior to channel processing such as error correcting encoding.

According to an optional feature of the invention, the transmission parameter is a modulation characteristic.

This may provide particularly advantageous performance and/or may facilitate implementation. The modulation characteristic constitutes a parameter which allows a particularly effective control of the probability of the receiver being able to successfully receive the data packet. The modulation characteristic may for example be a modulation symbol order or a modulation scheme.

According to an optional feature of the invention, the transmission parameter is an error coding characteristic.

This may provide particularly advantageous performance and/or may facilitate implementation. The error coding characteristic constitutes a parameter which allows a particularly effective control of the probability of the receiver being able to successfully receive the data packet. The error coding characteristic may for example be a coding rate or coding scheme.

According to an optional feature of the invention, the transmission parameter is a transmit power.

This may provide particularly advantageous performance and/or may facilitate implementation. The transmit power constitutes a parameter which allows a particularly effective control of the probability of the receiver being able to successfully receive the data packet.

According to an optional feature of the invention, the means for setting the operating point is arranged to further set the operating point in response to a measurement of a performance metric for the communication.

This may improve performance and may allow an improved adaptation to the current conditions.

According to an optional feature of the invention, the apparatus comprises means for receiving the channel quality indication from the first subscriber unit.

A channel quality indication may be determined by the first subscriber unit in response to a measurement. The feature may allow improved performance of the retransmission scheme. According to an optional feature of the invention, the means for determining the variation measure is arranged to determine the variation measure substantially as:

$$VarMeas(k) = \lambda * VarMeas(k-1) + (1-\lambda) * abs(CQI(k) - CQI(k-1))$$

where VarMeas is the variation measure, CQI indicates the channel quality measure and $\lambda$ is a predetermined parameter and k is an index.

This may provide particularly advantageous performance and/or may facilitate implementation.

According to an optional feature of the invention, the cellular communication system is a $3^{rd}$ Generation cellular communication system.

The $3^{rd}$ Generation cellular communication system may be a Universal Mobile Telecommunication System (UMTS). The invention may allow particularly advantageous performance for a $3^{rd}$ Generation cellular communication system.

According to an optional feature of the invention, the communication is in support of a High Speed Downlink Packet Access service.

The invention may allow particularly advantageous performance for an HSDPA service by the retransmission performance. Thereby an improved performance of the whole HSDPA service can be achieved.

According to an optional feature of the invention, the hybrid retransmission scheme is a Hybrid ARQ retransmission scheme.

The invention may allow particularly advantageous performance for a Hybrid ARQ retransmission scheme by improving the setting of the transmission parameters.

According to an optional feature of the invention, the transmission is a downlink transmission.

The invention may allow improved downlink communication in a cellular communication system.

According to a second aspect of the invention, there is provided a method of operating a hybrid retransmission scheme for a communication to a first subscriber unit over a communication channel of an air interface of a cellular communication system, the method comprising: setting a transmission parameter for a transmission of the communication in response to an operating point for the retransmission scheme; determining channel quality indications for the communication channel; determining a variation measure of a variation of the channel quality indications; and setting the operating point in response to the variation measure.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to an HSDPA service in a UMTS cellular communication system. However, it will be appreciated that the invention is not limited to this application but may be applied to many other cellular communication systems.

Figure 1:
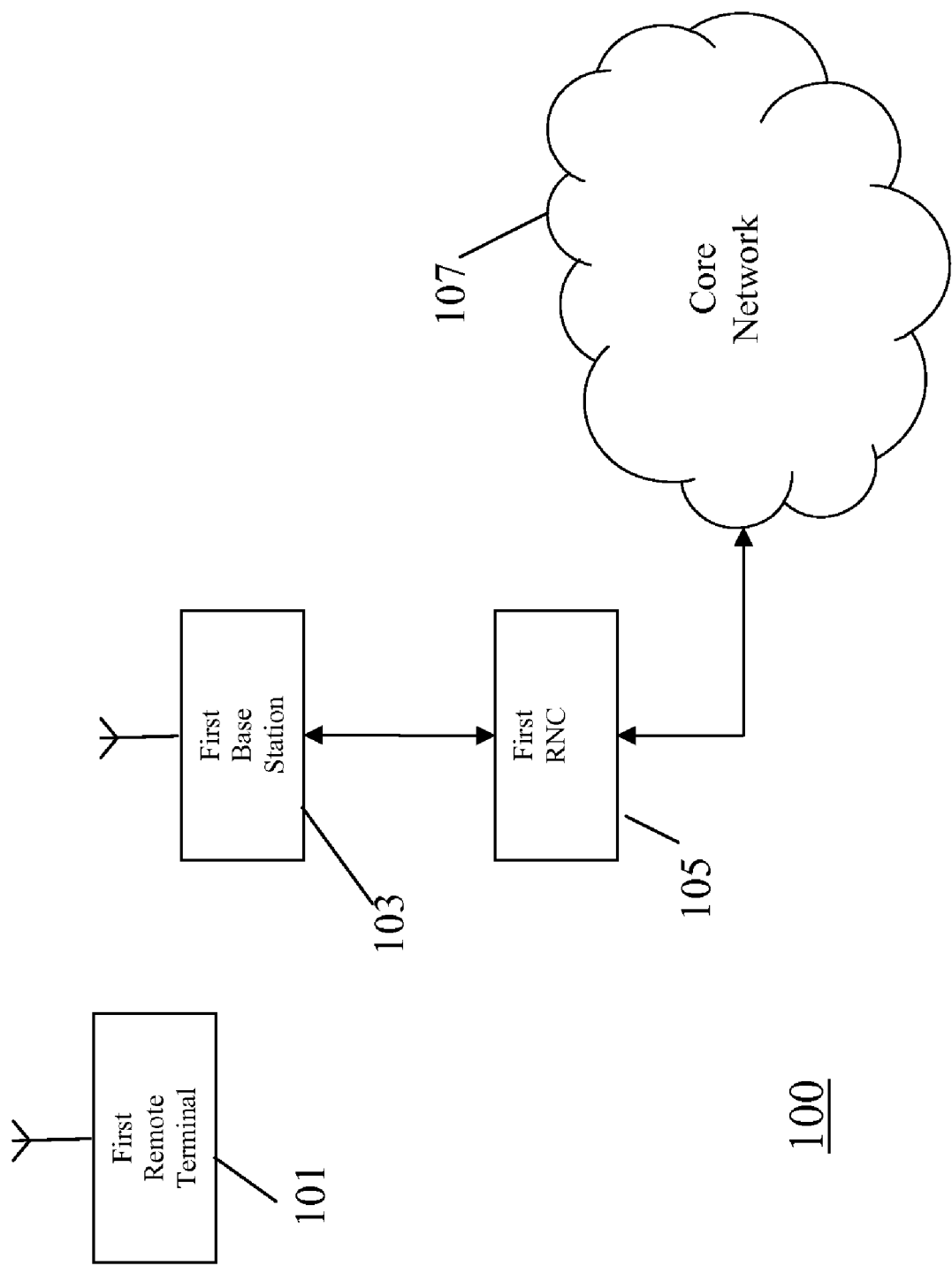
FIG. 1 illustrates an example of a cellular communication system in accordance with some embodiments of the invention.

FIG. 1 illustrates an example of a cellular communication system 100 in which embodiments of the invention may be employed.

In the example of FIG. 1, a first remote terminal 101 is in a first cell supported by a first base station 103. The first remote terminal 101 may e.g. be a user equipment such as a 3rd Generation User Equipment (UE), a communication unit, a subscriber unit, a mobile station, a communication terminal, a personal digital assistant, a laptop computer, an embedded communication processor or any physical, functional or logical communication element which is capable of communicating over the air interface of the cellular communication system.

The first base station 103 is coupled to a first RNC 105. An RNC performs many of the control functions related to the air interface including radio resource management and routing of data to and from appropriate base stations.

The first RNC 105 is coupled to a core network 107. A core network interconnects RNCs and is operable to route data between any two RNCs, thereby enabling a remote terminal in a cell to communicate with a remote terminal in any other cell. In addition, a core network comprises gateway functions for interconnecting to external networks such as the Public Switched Telephone Network (PSTN), thereby allowing remote terminals to communicate with landline telephones and other communication terminals connected by a landline. Furthermore, the core network comprises much of the functionality required for managing a conventional cellular communication network including functionality for routing data, admission control, resource allocation, subscriber billing, remote terminal authentication etc.

In the specific example of FIG. 1, the first remote terminal 101 supports an active HSDPA service. Thus, the first remote terminal 101 receives downlink data from the first base station 103 on the HSDPA shared downlink user channel HS-DSCH (High Speed-Downlink Shared CHannel) and transmits uplink HSDPA control information on the uplink HSDPA control channel HS-DPCCH (High Speed—Dedicated Physical Control CHannel). Whereas the HS-DSCH is shared between different HSDPA users, the HS-DPCCH is dedicated to the individual user equipment.

The downlink HSDPA communication on the HS-DSCH uses a Hybrid ARQ retransmission scheme for reducing the error rate. The first remote terminal 101 receives the transmissions from the first base station 103 and performs an error check. When a data packet is successfully received, the first remote terminal 101 transmits an acknowledge message (ACK message) and if the data packet is received in error a non-acknowledgement message is transmitted (a NACK message) and if no data packet is detected no message is transmitted. If the first base station 103 receives a no message (DTX) or a NACK message from the first remote terminal 101, it proceeds to retransmit data for the data packet. The retransmission data can in a Hybrid ARQ scheme be additional redundant data of the data packet or other information that can be combined with the earlier transmissions to increase the probability of correct detection.

When a remote terminal is involved in an HSDPA service, a number of control messages are transmitted from the remote terminal to the base station supporting the HSDPA service. For example, the first remote terminal 101 can transmit the retransmission acknowledge messages (Hybrid ARQ ACK/NACK messages) and indications of the quality of the communication channel (CQI—Channel Quality Indicators). These messages are transmitted on an HSDPA uplink control channel known as the HS-DPCCH (High Speed—Dedicated Physical Control CHannel).

Figure 2:
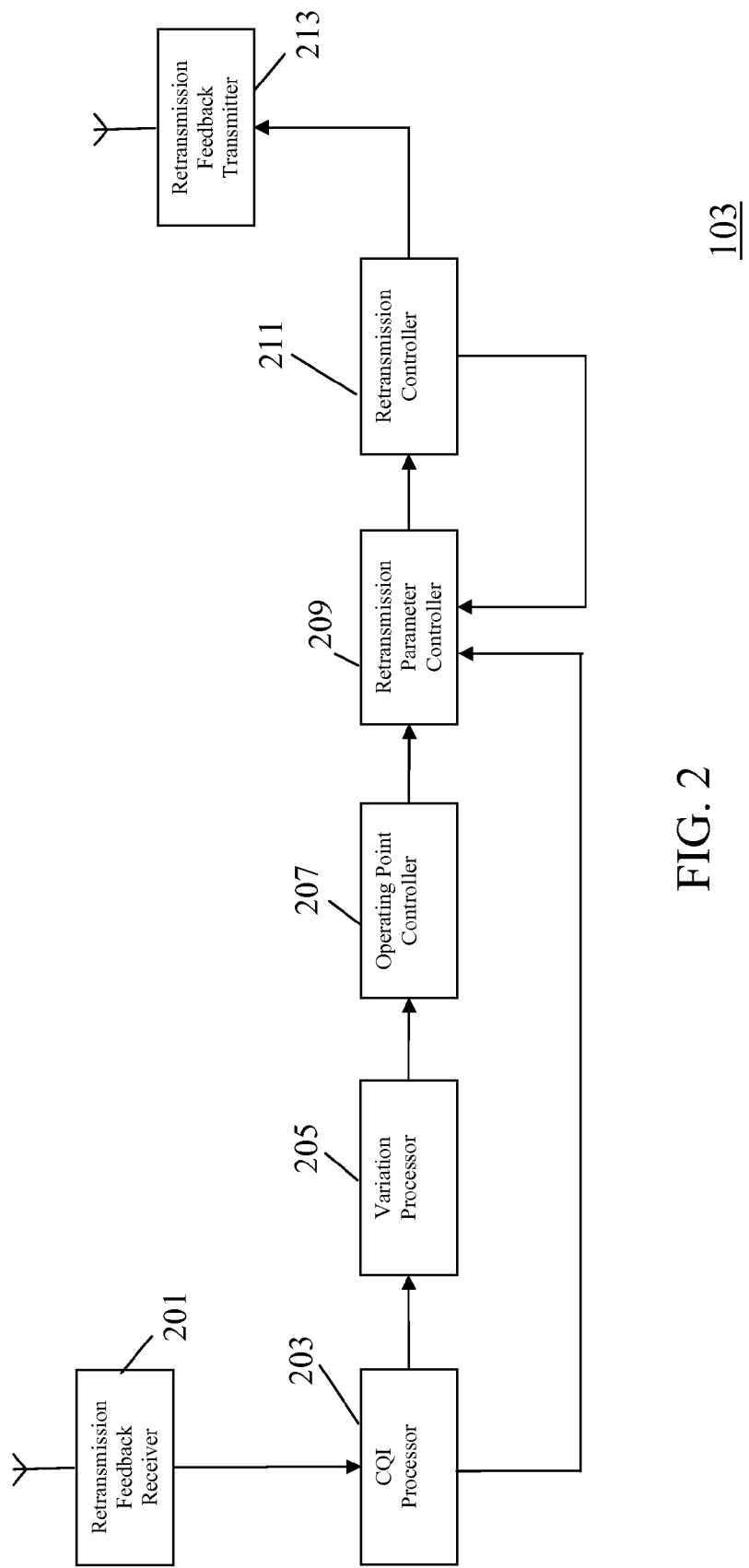
FIG. 2 illustrates elements of a base station in accordance with some embodiments of the invention.

FIG. 2 illustrates elements of a base station in accordance with some embodiments of the invention. Specifically, FIG. 2 illustrates elements of the first base station 103 which are associated with operating the Hybrid ARQ retransmission scheme for the HSDPA service.

In the example of FIG. 2, the first base station 103 is arranged to determine transmission parameters based on the specific channel conditions experienced. In particular, the base station 103 sets transmission parameters of the initial transmission (as opposed to subsequent retransmissions) of a data packet based on a variation measure for sequence of channel quality indications. Specifically, the first base station 103 can determine a rate of change for the CQI measurements reported from the first remote terminal 101. The rate of change is then used to set an operating point for the retransmission scheme and the transmission parameters for the initial (and possibly subsequent transmissions) are then controlled in view of this operating point.

The inventors of the current invention have realised that improved performance can be obtained by controlling the operating point in response to variations, and specifically in response to the rate of change, of the channel characteristics.

Figure 3:
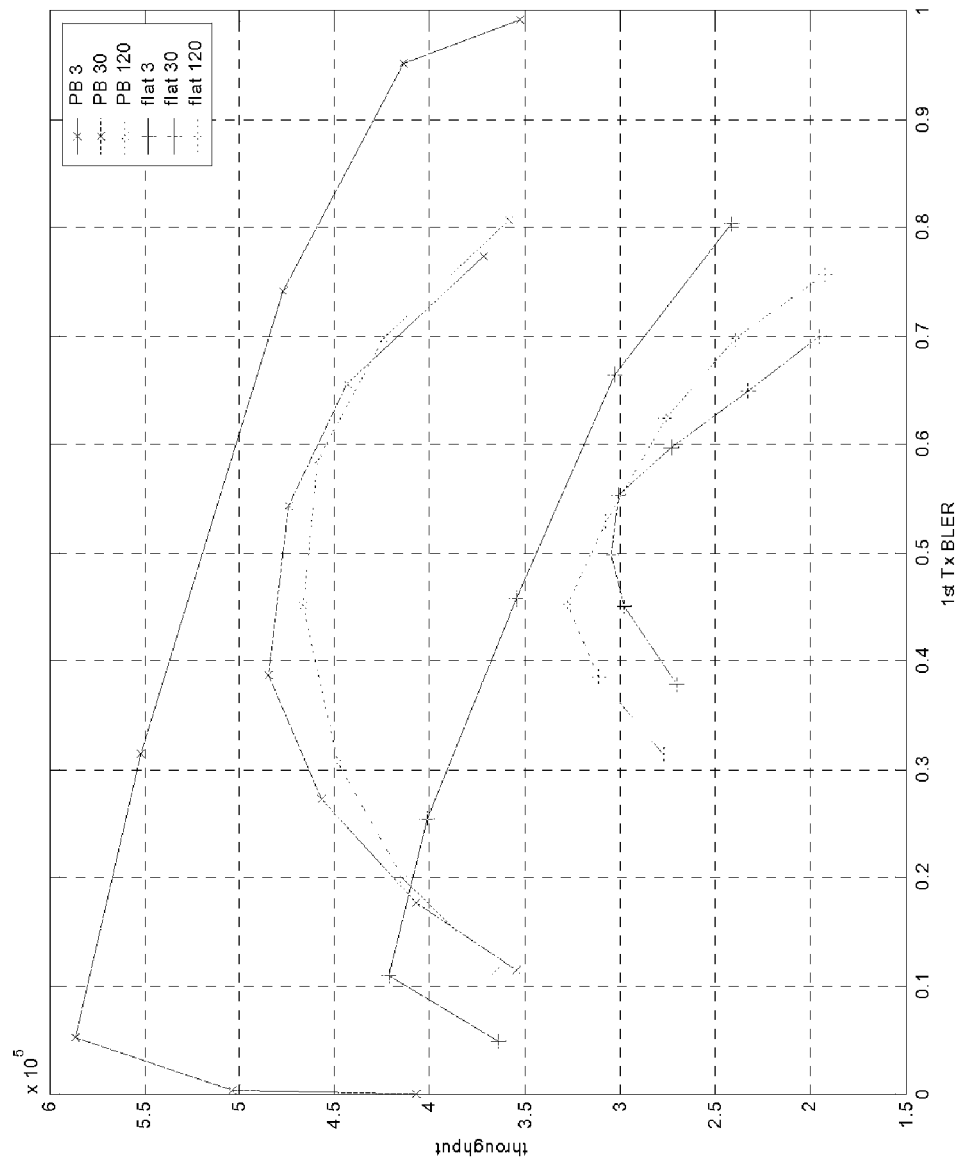
FIG. 3 illustrates an example of the relationship between throughput and the Block Error Rate for an HSDPA service using HARQ for different channel types.

FIG. 3 illustrates an example of the relationship between throughput and the Block Error Rate (BLER) of an initial transmission for an HSDPA service using HARQ for different channel types. As can be clearly seen, the maximum throughput which can be achieved depends significantly on the BLER. Accordingly, the retransmission scheme seeks to control the transmissions such that a BLER close to the optimal BLER can be achieved thereby optimising the throughput and the resource consumption. Furthermore, as exemplified by FIG. 3, the optimal BLER (and the achievable throughput) is highly dependent on the specific propagation channel experienced. In the example of FIG. 2, the first base station 103 estimates the channel conditions by determining a rate of change for the channel quality indicators and then sets an operating point, in the form of an target BLER, for the retransmission scheme.

Thus, the first base station 103 determines channel quality indications and uses these as an indication of the propagation channel experienced. An operating point in the form of an optimum BLER is then determined based on the variation measure. This operating point is then used by the retransmission scheme to set the transmission parameters such that the transmissions as far as possible experience the desired BLER performance. The retransmission scheme may specifically measure the BLER performance of initial transmissions and adjust the transmission parameters for subsequent initial transmissions such that this performance is driven towards the operating point (the target BLER determined from the variation measure). As a result, a significantly increased throughput and thus reduced resource consumption can be achieved.

The first base station 201 comprises a retransmission feedback receiver 201 which receives retransmission feedback messages from the first remote terminal 101. Specifically, the retransmission feedback receiver 201 receives ACK and NACK messages for an HSDPA service on an HS-DPCCH channel.

In addition, the retransmission feedback receiver 201 receives channel quality indications from the first remote terminal 101. Specifically, the retransmission feedback receiver 201 receives CQI (Channel Quality Indication) messages for the HSDPA service on the HS-DPCCH channel.

The first remote terminal 101 can specifically determine the channel quality indications for the propagation channel from the first base station 103 to the first remote terminal 101 in response to measurements of the received downlink signal. For example, the channel quality indications can be determined as received signal level indications, signal to noise ratios or received error rates. Specific methods and algorithms for generating CQI messages for HSDPA will be well known to the person skilled in the art.

The retransmission feedback receiver 201 is coupled to a CQI processor 203 which determines the channel quality indications for the communication channel from the first base station 103 to the first remote terminal 101. In the specific example the CQI processor 203 simply extracts the CQI values received in the CQI messages.

The CQI processor 203 is coupled to a variation processor 205 which is arranged to generate a variation measure for the CQI values.

It will be appreciated that any suitable variation measure can be used without detracting from the invention. In the specific example, the variation processor 205 determines the rate of change for the communication channel. The rate of change can be determined as an output of a low pass filtering of the difference between adjacent CQI values. The parameters and characteristics of the low pass filtering can be set to suit the specific requirements for the individual embodiment.

The variation processor 205 can specifically determine the variation measure substantially as:

$$\text{VarMeas}(k)=\lambda*\text{VarMeas}(k-1)+(1-\lambda)*abs(\text{CQI}(k)-\text{CQI}(k-1))$$

where VarMeas is the variation measure, CQI indicates the channel quality values and $\lambda$ is a design parameter that can be selected for the specific dynamic performance desired for the individual application.

The variation processor 205 is coupled to an operating point controller 207 which sets an operating point for the retransmission scheme in response to the variation measure.

In the example of FIG. 2, the operating point is an optimal target BLER which is used by the retransmission scheme. The operating point controller 207 thus determines a target BLER in response to the determined rate of change of the CQI values. Specifically, the operating point controller 209 determines the target BLER for the initial transmission of the data packet.

It will be appreciated that any suitable way of determining the operating point in response to the variation measure can be used. For example, the operating point controller 207 can simply comprise a look-up-table containing corresponding values for the variation measure and the target BLER.

The operating point controller 207 is coupled to a retransmission parameter controller 209 which is arranged to set at least one transmission parameter for a transmission of the communication in response to the operating point. The retransmission parameter controller 209 thus sets the transmission parameters such that they are likely to result in a BLER corresponding to the target BLER.

The exact nature of which parameters that are set by the retransmission parameter controller 209 can be different in different embodiments. One transmission parameter that may be highly suitable for adjustment depending on the target BLER is the transmit power of the transmissions. By increasing the transmit power the BLER will be reduced, and by reducing the transmit power the BLER will be increased. Furthermore, the transmit power is a parameter that can easily be adjusted in many embodiments.

Alternatively or additionally, the retransmission parameter controller 209 can modify the information data size for a data packet in response to the target BLER. This may advantageously be combined with an adjustment of a modulation characteristic and/or an error coding characteristic.

For example, if a high BLER operating point is determined, the retransmission parameter controller 209 can set the information data size relatively high so that the data packet comprises a high amount of user data. In order to fit this high amount of user data into a fixed size data packet, the retransmission parameter controller 209 can select a use order modulation symbol constellation (e.g. 16-QAM) which have a higher spectral efficiency but also a higher error rate probability. Alternatively or additionally, the retransmission parameter controller 209 can select a high rate forward error correction scheme to be applied to the information data.

If instead a low BLER operating point is determined, the retransmission parameter controller 209 can set the information data size relatively low so that the data packet comprises a low amount of user data. For a fixed size data packet this will allow the retransmission parameter controller 209 to select the use of lower order modulation symbols (e.g. BPSK or QPSK) which have a lower spectral efficiency but also a lower error rate probability. Alternatively or additionally, the retransmission parameter controller 209 can select a lower rate forward error correction scheme to be applied to the information data.

It will be appreciated that any suitable way of determining the transmission parameters in response to the operating point can be used. For example, the operating point controller 207 can simply comprise a look-up-table containing predetermined suitable transmission parameters for a given target BLER. Thus, for a given target BLER the look-up-table can provide a predetermined transmit power, coding scheme and information data size value.

The retransmission parameter controller 209 is coupled to a retransmission controller 211 which operates the HARQ retransmission scheme. Specifically, the retransmission controller 211 uses the transmission parameters provided by the retransmission parameter controller 209 to initial transmissions of a data packet. Thus, the first base station 103 provides for the initial HARQ transmissions to be optimised for the specific channel conditions currently experienced thereby resulting in increased throughput and reduced resource consumption, and thus in improved performance of the cellular communication system as a whole.

It will be appreciated that the operating point and transmission parameters can also take into account other factors and characteristics than those described above. For example, the operating point can be set in response to a measurement of a performance metric, such as an achieved error rate, for the communication.

In the example of FIG. 2, the retransmission controller 211 is coupled to the retransmission parameter controller 209. The retransmission controller 211 monitors the received retransmission feedback messages and specifically monitors the BLER of the initial transmissions (from the number of NACKs vs. ACKs received from the first remote terminal 101).

This BLER of initial transmissions is fed to the retransmission parameter controller 209 and is compared to the target BLER from the operating point controller 207. If the two BLERs do not match sufficiently close, the retransmission parameter controller 209 can adjust the operation such that the achieved BLER is biased towards the desired target BLER.

It will be appreciated that this can be achieved in a number of different ways. For example the retransmission parameter controller 209 can directly modify the operating point before using it when selecting transmission parameters. For example, the target BLER can be increased or decreased dependent in the measured BLER such that a modified target BLER is used by the algorithm selecting the transmission parameters.

Equivalently, the retransmission parameter controller 209 can adjust the selection of the transmission parameters directly. For example, if the comparison indicates that the achieved BLER tends to be higher than the target BLER for the initial transmissions, an offset can be applied to the selected transmit power resulting in a higher transmit power being used.

As another example, the retransmission parameter controller 209 can modify one are more other parameters which are used in selecting the transmission parameters.

Specifically, in the system of FIG. 2, the transmission parameters for the initial transmissions are set depending on the current channel conditions experienced on the propagation channel from the first base station 103 to the first remote terminal 101. In particular the retransmission parameter controller 209 is coupled to the CQI processor 203 and receives the CQI values therefrom. These values are then used when setting the transmission parameters. For example, if the CQI values indicate that the current channel quality is relatively low a higher transmit power is used, and if the CQI values indicate that the current channel quality is relatively high a lower transmit power is used. This provides a compensation for the channel variations and provides an increased probability of matching the desired BLER.

In the example of FIG. 2, the retransmission parameter controller 209 is arranged such that the channel quality indication used in setting the transmission parameters can be modified in response to the comparison between the achieved BLER and the target BLER.

Specifically, the CQI value used for setting the parameters is determined as:

$$CQI_{TransmissionParameter} = CQI_{Received} + \text{offset}$$

where the offset is initially set to zero and subsequently adjusted in response to the measured values.

Specifically, the offset can periodically be updated according to the following algorithm described by pseudo-code:

```
if BLER_measured>BLER_target
    offset=offset-delta
else
    offset=offset+delta
end
``` where delta is a suitable small compensation value.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. An apparatus for operating a hybrid retransmission scheme for a communication to a first subscriber unit over a communication channel of an air interface of a cellular communication system, the apparatus comprising:

means for determining a measured error rate indication of transmissions to the first subscriber unit;

setting means for setting a transmission parameter for a transmission of the communication in response to an error rate target for the retransmission scheme;

means for determining channel quality indications for the communication channel;

means for determining a rate of change measure of a variation of the channel quality indications; and means for setting the error rate target in response to the rate of change measure of the channel quality indications;

wherein the means for determining the rate of change of a variation of the channel quality indications is determined by:

$$\text{VarMeas}(k)=\lambda*\text{VarMeas}(k-1)+(1-\lambda)*abs(\text{CQI}(k)-\text{CQI}(k-1))$$

where VarMeas is the rate of change measure, CQI indicates the channel quality measure and $\lambda$ is a predetermined parameter and k is an index.

2. The apparatus of claim 1 wherein the transmission parameter is a parameter of an initial transmission of a data packet.

3. The apparatus of claim 1 wherein the setting means is arranged to set the transmission parameter in response to the channel quality indication and to modify the channel quality indication in response to the measured error rate indication.

4. The apparatus of claim 1 wherein the transmission parameter is an information data size for a data packet of the hybrid retransmission scheme.

5. The apparatus of claim 1 wherein the transmission parameter is a modulation characteristic.

6. The apparatus of claim 1 wherein the transmission parameter is an error coding characteristic.

7. The apparatus of claim 1 wherein the transmission parameter is a transmit power.

8. The apparatus of claim 1 wherein the means for setting the error rate target is arranged to further set the error rate target in response to a measurement of a performance metric for the communication.

9. A method of operating a hybrid retransmission scheme for a communication to a first subscriber unit over a communication channel of an air interface of a cellular communication system, the method comprising:

determining a measured error rate indication of transmissions to the first subscriber unit;

setting a transmission parameter for a transmission of the communication in response to an error rate target for the retransmission scheme;

determining channel quality indications for the communication channel;

determining a rate of change measure of a variation of the channel quality indications; and setting the error rate target in response to the rate of change measure of the channel quality indications;

wherein determining the rate of change measure of a variation of the channel quality indications is determined by:

$$\text{VarMeas}(k)=\lambda*\text{VarMeas}(k-1)+(1-\lambda)*abs(\text{CQI}(k)-\text{CQI}(k-1))$$

where VarMeas is the rate of change measure, CQI indicates the channel quality measure and $\lambda$ is a predetermined parameter and k is an index.

* * * * *